United States Patent
Whitehouse et al.

(10) Patent No.: US 11,214,132 B1
(45) Date of Patent: Jan. 4, 2022

(54) MOUNTING SYSTEM FOR VEHICLE STORAGE COMPARTMENT

(71) Applicant: Innomotive Solutions Group Inc., Burlington (CA)

(72) Inventors: Bruce Whitehouse, Milton (CA); Jaimin Shah, Brampton (CA); Martin Conte, Hamilton (CA)

(73) Assignee: INNOMOTIVE SOLUTIONS GROUP INC., Burlington (CA)

( * ) Notice: Subject to any disclaimer, the term of this patent is extended or adjusted under 35 U.S.C. 154(b) by 0 days.

(21) Appl. No.: 17/094,268

(22) Filed: Nov. 10, 2020

(51) Int. Cl.
  *B60J 5/04* (2006.01)
  *B60J 5/08* (2006.01)

(52) U.S. Cl.
  CPC .............. *B60J 5/0493* (2013.01); *B60J 5/08* (2013.01)

(58) Field of Classification Search
  CPC ... E06B 9/17; B60J 5/0493; B60J 5/08; B60R 13/07; B60R 9/02; A62C 27/00
  See application file for complete search history.

(56) References Cited

U.S. PATENT DOCUMENTS

| | | | | |
|---|---|---|---|---|
| 5,246,054 A | * | 9/1993 | Shepherd | E06B 9/17046 |
| | | | | 160/133 |
| 6,022,067 A | * | 2/2000 | Hargett | B60J 5/08 |
| | | | | 296/155 |
| 6,085,825 A | * | 7/2000 | Swink | B60J 5/08 |
| | | | | 160/133 |
| 2006/0037760 A1 | * | 2/2006 | Froland | A62C 27/00 |
| | | | | 169/24 |
| 2010/0050529 A1 | * | 3/2010 | Manser | E06B 9/06 |
| | | | | 49/199 |
| 2013/0025800 A1 | * | 1/2013 | Kiesenhofer | B60J 5/08 |
| | | | | 160/133 |
| 2018/0119482 A1 | * | 5/2018 | Chang | E06B 7/14 |
| 2019/0178032 A1 | * | 6/2019 | McNabb | E06B 9/17076 |
| 2020/0002993 A1 | * | 1/2020 | Thouin | B60J 5/067 |
| 2020/0071974 A1 | * | 3/2020 | Burns | E06B 9/15 |

* cited by examiner

*Primary Examiner* — Jason S Morrow
(74) *Attorney, Agent, or Firm* — Husch Blackwell LLP (57) ABSTRACT

A bidirectional shield system for a roll-up shutter door of an externally accessible vehicle compartment comprises a longitudinally extending shield element and two mounting blocks. The shield element comprises a tray having an open-topped drip catchment reservoir and laterally inwardly projecting locking ears at each end of the shield element. Each mounting block can be fixed to a sidewall of the compartment, has at least one overhanging upper trap projection and carries a pair of latches disposed inferiorly of and spaced from the trap projection. The latches are movable between retracted and extended configurations. With the latches in the extended configuration, the locking ears are trapped between the latches and the trap projections to fix the shield element within the compartment. When the latches are in the retracted configuration, the shield element can move away from the trap projections for removal of the shield element from the compartment.

15 Claims, 11 Drawing Sheets

MOUNTING SYSTEM FOR VEHICLE STORAGE COMPARTMENT

TECHNICAL FIELD

The present disclosure relates to externally accessible storage compartments with roller-shutter doors.

BACKGROUND

Many types of commercial, industrial and emergency vehicles are provided with externally accessible storage compartments. As one non-limiting example, firefighting vehicles, colloquially known as "fire trucks", may be provided with such compartments to store equipment such as hoses, axes and other firefighting tools. Such compartments are often closable by way of a roller shutter door.

Roller-shutter doors comprise a door formed from a plurality of long, narrow door slats that are longitudinally hingedly coupled to one another, with a superior end of the roller-shutter door being coupled to a retraction roller and longitudinal ends of the door slats riding along door guide channels. The roller-shutter door can be opened by rolling it onto the retraction roller and closed by unrolling it from the retraction roller. One illustrative, non-limiting example of a roller shutter door is described in U.S. Patent Application Publication No. 2019/0178032, which is incorporated by reference herein.

While roller-shutter doors provide a convenient closure mechanism, there are some drawbacks. One of these is that if the roller-shutter door is wet, when in the open configuration (rolled onto the retraction roller), the liquid can drip into the compartment, potentially damaging equipment contained therein. Conversely, during hurried retrieval of equipment from the compartment, the equipment may strike and damage the rolled up door. Both of these possibilities are immediately apparent for fire trucks, but these risks extend to other contexts as well.

One solution to this dilemma is to position a drip shield in the compartment below the retraction roller; this drip shield can catch moisture dripping off the rolled up door to protect the equipment while also protecting the rolled up door against impacts from below. Examples include the AMDOR® DT-1000 and DT-1010 model drip trays, which can be removed from the compartment when maintenance of the roller-shutter door is required, and then reinstalled. While installation and removal of the DT-1000 and DT-1010 model drip trays is simple and straightforward, improvements in the mounting and retention structure remain possible.

SUMMARY

In one aspect, a bidirectional shield system is provided for a roll-up shutter door of an externally accessible vehicle compartment. The shield system comprises a longitudinally extending shield element and two mounting blocks. The shield element comprises a longitudinally extending tray having an open-topped drip catchment reservoir formed in the tray and laterally inwardly projecting locking ears disposed at longitudinal ends of the shield element. Each mounting block is configured to be fixed to a sidewall of the compartment in opposed facing registration with one another, and each mounting block has at least one overhanging upper trap projection and carries a pair of latches disposed inferiorly of and spaced from the trap projection. The latches are movable between a retracted configuration and an extended configuration. The locking ears are sized, positioned and configured to fit between the latches in the extended configuration and the trap projection. When the mounting blocks are fixed to the sidewall of the compartment in opposed facing registration with one another, with the latches in the extended configuration and the locking ears disposed between the latches and the trap projection, the locking ears are trapped between the latches and the trap projections to fix the shield element within the compartment. In this position, the shield element extends substantially horizontally between the mounting blocks with the drip catchment reservoir facing upward. When the latches are in the retracted configuration, the shield element is free to fall away from the trap projections for removal of the shield element from the compartment.

In an embodiment, the latches are biased toward the extended configuration.

In an embodiment, the latches are movable toward one another into the retracted configuration and away from one another into the extended configuration.

In one particular embodiment, the latches are substantially L-shaped and each comprise a latching arm and an actuator arm, with the latching arm slidably carried by the mounting block and configured to confine a respective one of the locking ears between the latching arm and the trap projection. For each mounting block, a biasing member is carried by the mounting block and disposed between the latches to bias the latches away from one another toward the extended configuration. In a particular implementation, the locking ears extend longitudinally beyond a tray end of the shield element whereby a receiving space is formed between the locking ears, and the latching arms are slidably disposed within a latch housing that is configured to fit in the receiving space between the locking ears. Each latching arm may have a sloped outer distal end relative to the respective actuator arm, with the sloped outer distal end forming a latching arm guide surface, and each locking ear may have a sloped inner end forming a locking ear guide surface. In such an embodiment, the latching arm guide surfaces and the locking ear guide surfaces are mated and configured such that sliding engagement of the latching arm guide surfaces with the locking ear guide surfaces urges the latches toward one another from the extended configuration toward the retracted configuration.

In an embodiment, each trap projection has a sloped roof, and when the shield element extends substantially horizontally between the mounting blocks with the drip catchment reservoir facing upward, the sloped roofs of the trap projection drain into the drip catchment reservoir.

In one embodiment, each mounting block is configured to be fixed directly to the respective sidewall of the compartment. In another embodiment, each mounting block is configured to be fixed indirectly to the respective sidewall of the compartment by at least one supporting component interposed between the mounting block and the respective sidewall of the compartment. The supporting component(s) may comprise at least one mounting plate.

BRIEF DESCRIPTION OF THE DRAWINGS

These and other features will become more apparent from the following description in which reference is made to the appended drawings wherein.

DETAILED DESCRIPTION

Figure 1:
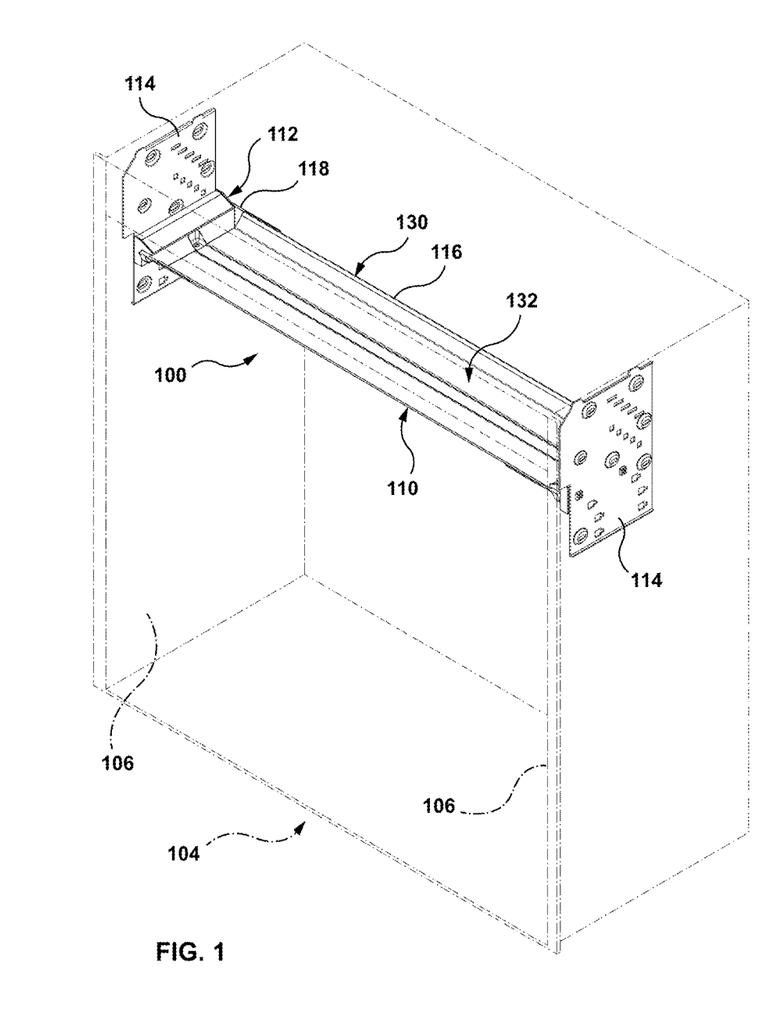
FIGS. 1 through 1B are top perspective views showing an illustrative bidirectional shield system according to the present disclosure, mounted within an externally accessible vehicle compartment.
Figure 1A:
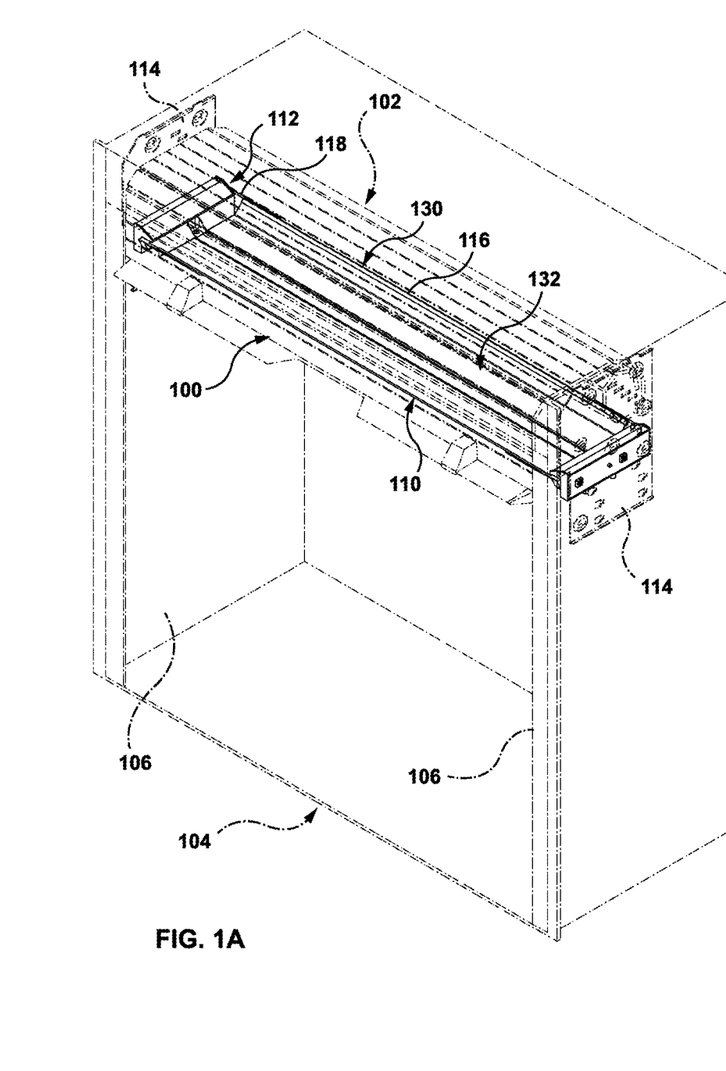

Reference is now made to FIGS. 1 and 1A, which shows an illustrative embodiment of a bidirectional shield system, indicated generally by reference 100. The shield system 100 is adapted for use in conjunction with a roll-up shutter door 102 (see FIG. 1A) of an externally accessible vehicle compartment 104, shown in dashed lines in FIGS. 1 and 1A. In FIG. 1, the roll-up shutter door 102 is removed to better illustrate the shield system 100 within the compartment 104; FIG. 1A shows the shield system 100 and compartment 104 with the roll-up shutter door 102 in place. The shield system 100 extends substantially horizontally between opposed sidewalls 106 of the compartment 104.

Figure 1B:
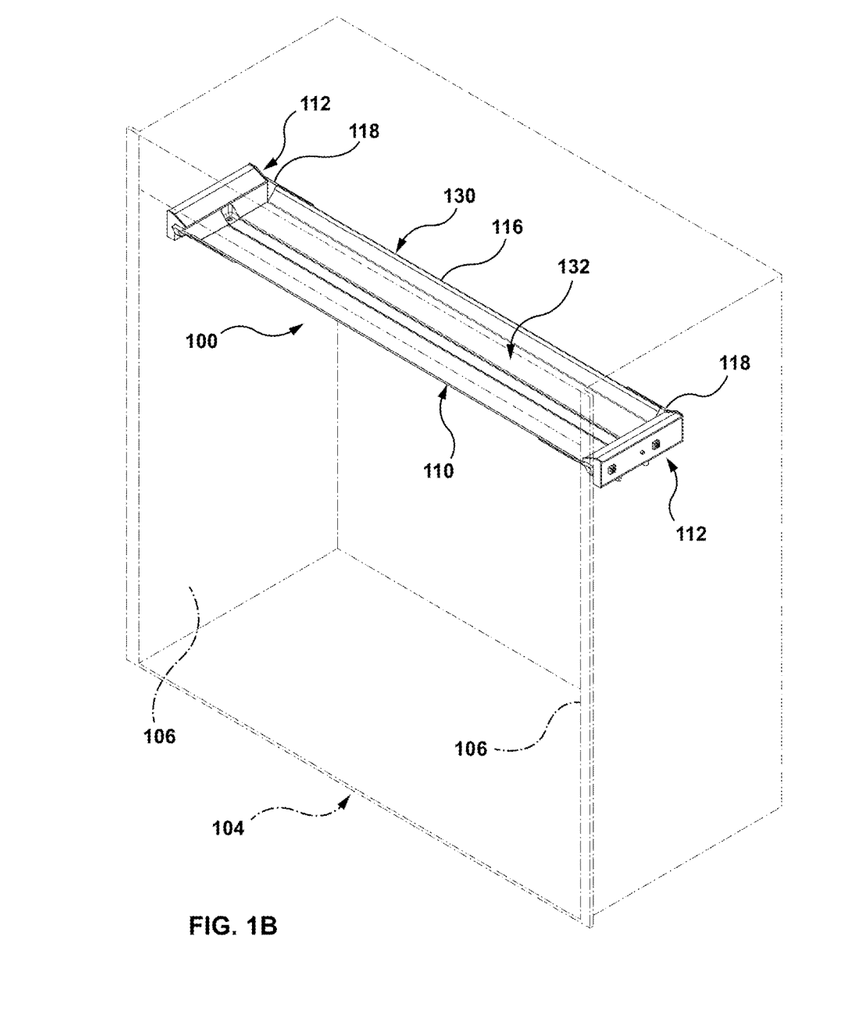
Figure 2:
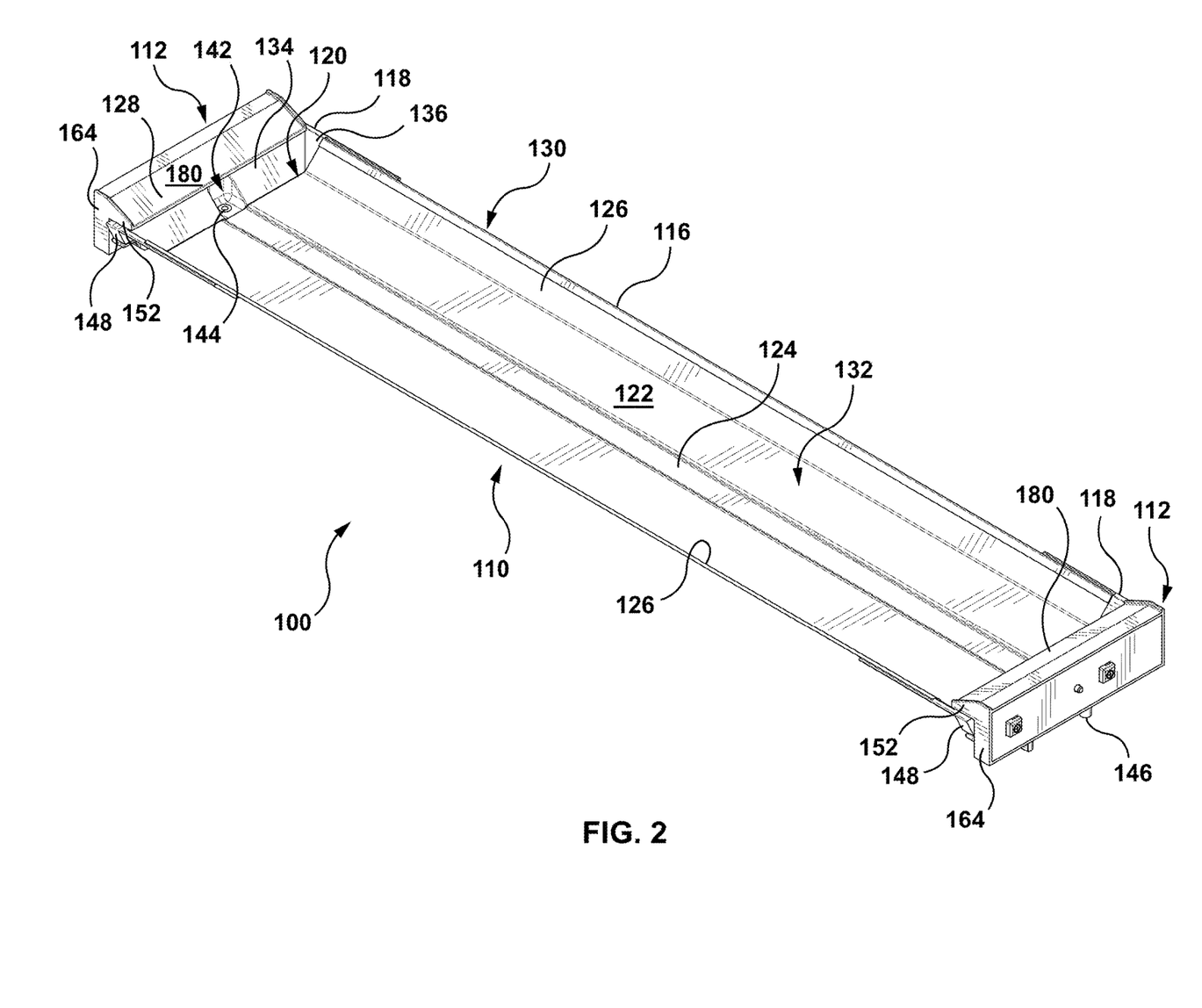
FIG. 2 is a perspective view showing the illustrative bidirectional shield system in isolation.

The bidirectional shield system 100 is shown in more detail in FIG. 2. The shield system 100 comprises a longitudinally extending shield element 110 and two mounting blocks 112 that are configured and adapted to releasably retain the shield element 110, as described in more detail below. Each mounting block 112 is configured to be fixed to a sidewall 106 of the compartment 104 in opposed facing registration with one another. As can be seen in FIG. 1, in the illustrated embodiment each mounting block 112 is configured to be fixed indirectly to the respective sidewall of the compartment by a respective mounting plate 114 interposed between the mounting block 112 and the respective sidewall 106 of the compartment 104. The mounting plates 114 may be bolted, riveted, welded or otherwise suitably secured to the sidewalls 106, and the mounting blocks 112 may be likewise be bolted, riveted, welded or otherwise suitably secured to the mounting plates 114. Preferably, the mounting blocks 112 are releasably secured to the mounting plates 114. The mounting plates 114 are merely illustrative of one type of supporting component, and one or more supporting components of other types may be interposed between the mounting block 112 and the respective sidewall 106 of the compartment 104. Alternatively, in other embodiments each mounting block 112 may be configured to be fixed directly to the respective sidewall 106 of the compartment 104, as shown in FIG. 1B.

Figure 11:
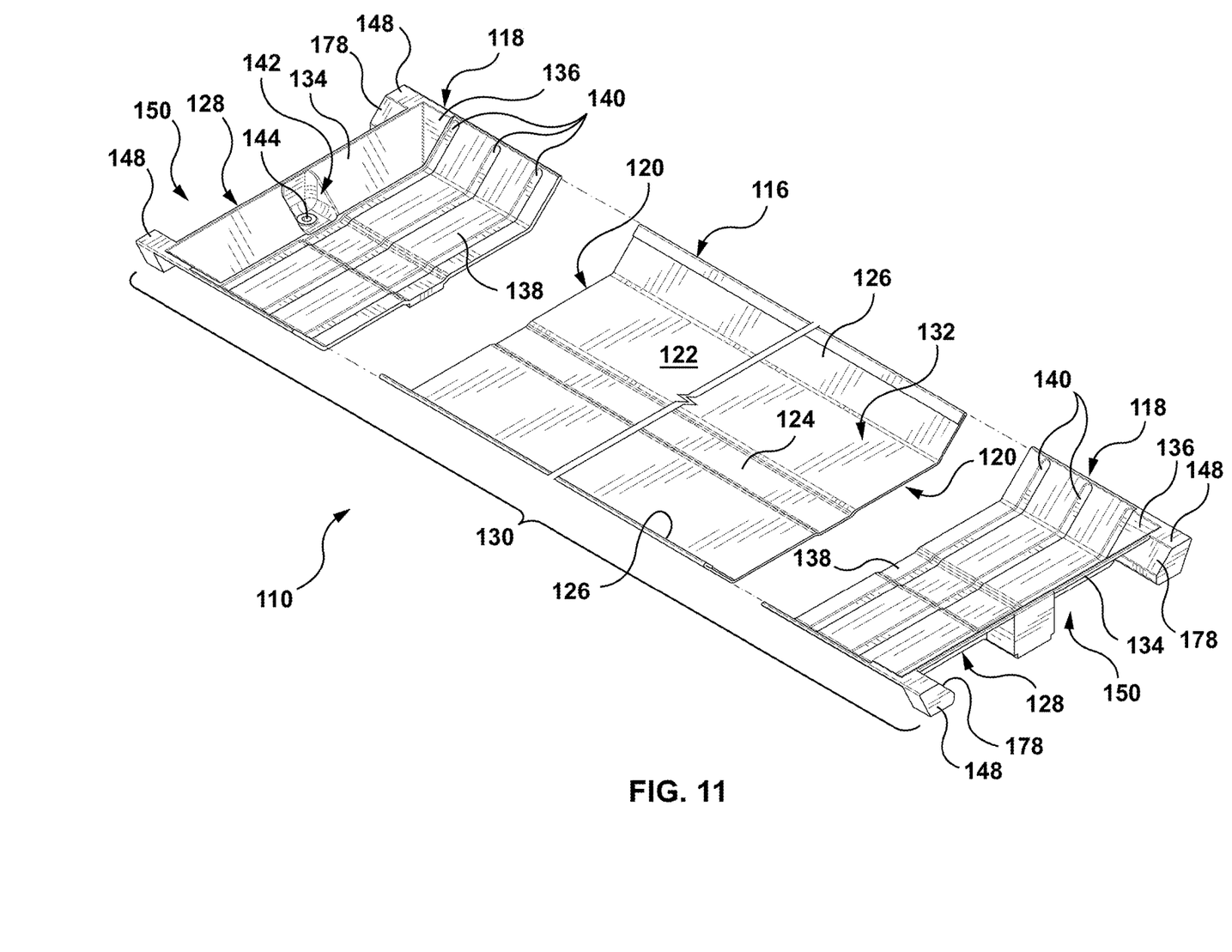
FIG. 11 is an exploded top perspective view of the illustrative shield element.

Reference is now made to FIG. 11. In the illustrated embodiment, the shield element 110 comprises a longitudinally extending tray base 116 having an end cap 118 disposed at each longitudinal end 120 of the tray base 116. As can be seen in the Figures, in the illustrated embodiment the tray base 116 is generally trough-shaped, and has a generally flat or planar basal surface 122 having a longitudinally extending channel 124 formed therein, with opposed sides 126 extending along the basal surface 122. The sides 126 of the tray base 116 slope inwardly toward the basal surface 122. In one preferred embodiment, the tray base 116 is monolithically formed, for example from sheet metal, including but not limited to aluminum, steel, or stainless steel, or from extruded plastic. The end caps 118 and mounting blocks 112 can also be machined metal or can be injection molded plastic parts. These are merely illustrative examples and are not intended to be limiting.

Continuing to refer to FIG. 11, each end cap 118 forms a tray end 128 of a tray 130, wherein an open-topped drip catchment reservoir 132 is formed in the tray 130. The tray 130 is formed by cooperation of the end caps 118 with the tray base 116. More particularly, in the illustrated embodiment each end cap 118 is configured to mate with a respective longitudinal end 120 of the tray base 116. Thus, each end cap 118 forms a longitudinal end 128 of the tray 130 and hence a tray end 128 of the shield element 110. In the illustrated embodiment, each end cap 118 comprises an end wall 134 joined with two opposed side walls 136 inclined at substantially the same angle as the slope of the sides 126 of the tray base 116. A tray base support 138 extends from the end wall 134 of each end cap 118, between the side walls 136 thereof, to receive the longitudinal ends 120 of the tray base 116. The upper surface of the tray base support 138 is complementary in shape to the lower surface of the tray base 116, and the tray base supports 138 may be secured to the longitudinal ends 120 of the tray base 116 by any suitable technique. In the illustrated embodiment, the tray base support 138 is provided with adhesive-receiving channels 140 for securing the tray base 116 by adhesive; this is merely one illustrative technique. For example, depending on the materials used, the tray base 116 may alternatively be secured to the tray base support 138 by welding, ultrasonic welding, rivets or bolts, among others. In the illustrated embodiment, a recess 142 is formed in the end wall 134 of each end cap 118 and is provided with a drainage aperture 144. The drainage aperture 142 may be connected in fluid communication with a drainage tube 146 (see FIGS. 3 and 4) for drainage of liquid that would otherwise accumulate in the drip catchment reservoir 132, or may be closed with a plug (not shown). The longitudinally extending channel 124 communicates with the recesses 142 to facilitate drainage.

Reference is now made to FIGS. 3 and 4 and FIGS. 7 and 8, which show the mounting blocks 112 separated from the shield element 110. Each end cap 118 comprises a pair of opposed, laterally inwardly projecting locking ears 148, which are thus disposed at longitudinal ends 128 of the shield element 110. In the illustrated embodiment, the locking ears 148 extend longitudinally away from the tray 130 beyond the tray end 128, and a receiving space 150 is formed between the locking ears 148. In other embodiments (not shown) the locking ears and receiving space may be disposed within the tray, or above the tray in registration therewith.

Each mounting block 112 has an overhanging upper trap projection 152 which, when the mounting block 112 is mounted on the sidewall 106, will project inwardly into the compartment 104. In the illustrated embodiment each mounting block 112 has a single trap projection 152 extending across the entire width of the mounting block 112; in other embodiments there may be more than one trap projection. Each mounting block 112 carries a pair of latches 154 disposed inferiorly of and spaced from the trap projection 152. The word "inferiorly" is used in the sense of "below" when the mounting block 112 is installed in the compartment 104 in the configuration shown in FIGS. 1 through 1B.

Figure 3:
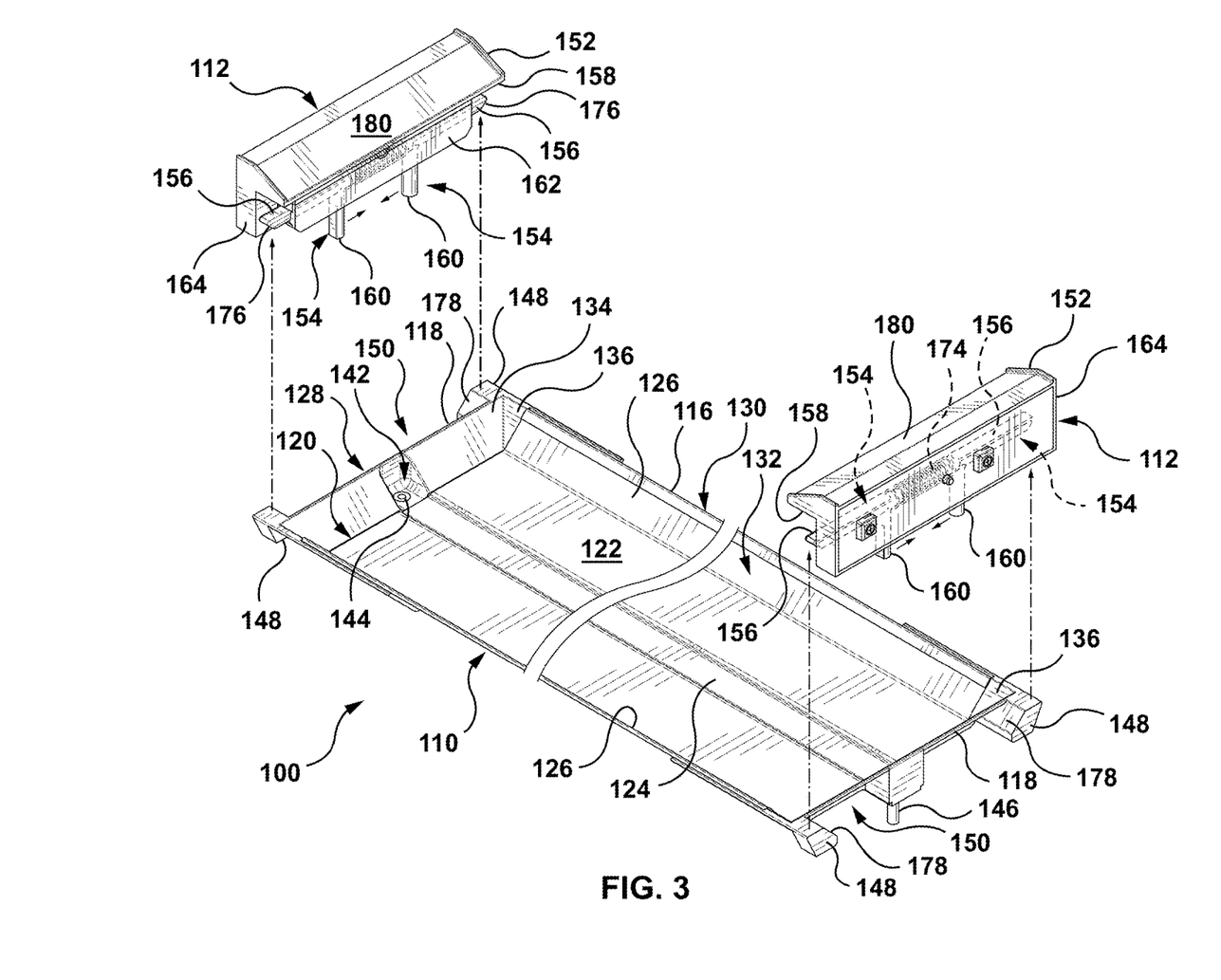
FIGS. 3 to 6 are top perspective views showing mounting of an illustrative shield element of the bidirectional shield system to illustrative mounting blocks of the bidirectional shield system.
Figure 4:
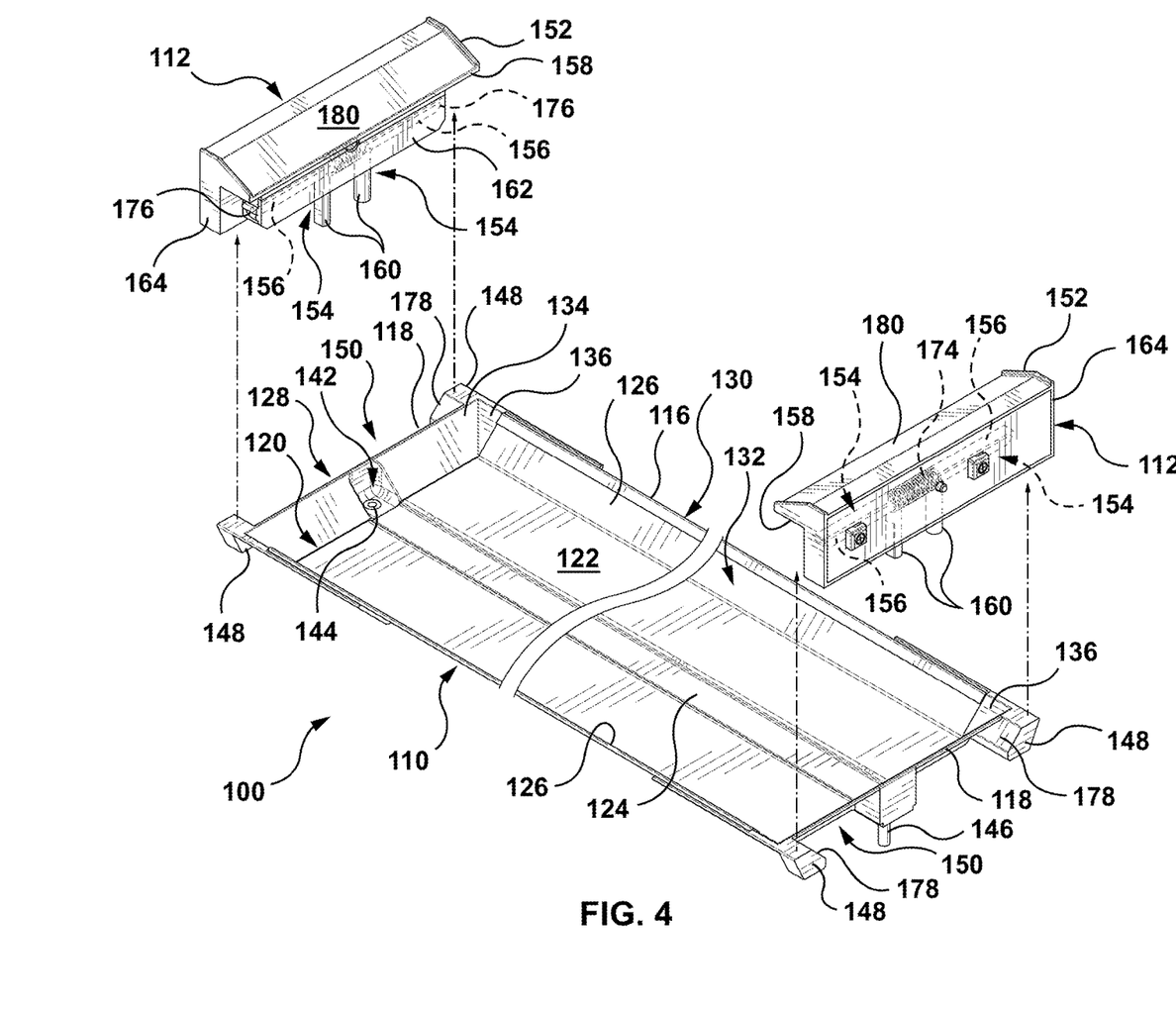
Figure 5:
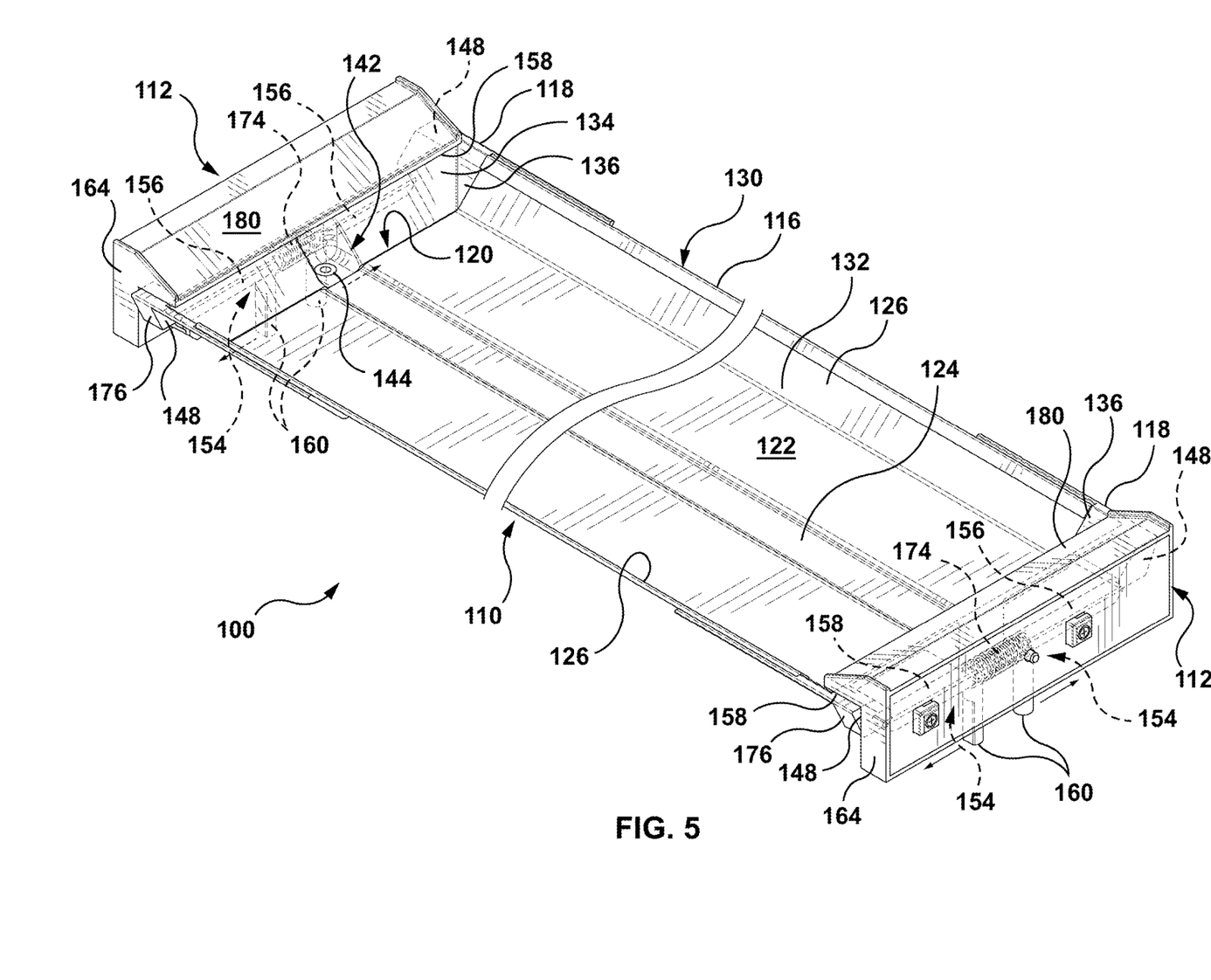
Figure 6:
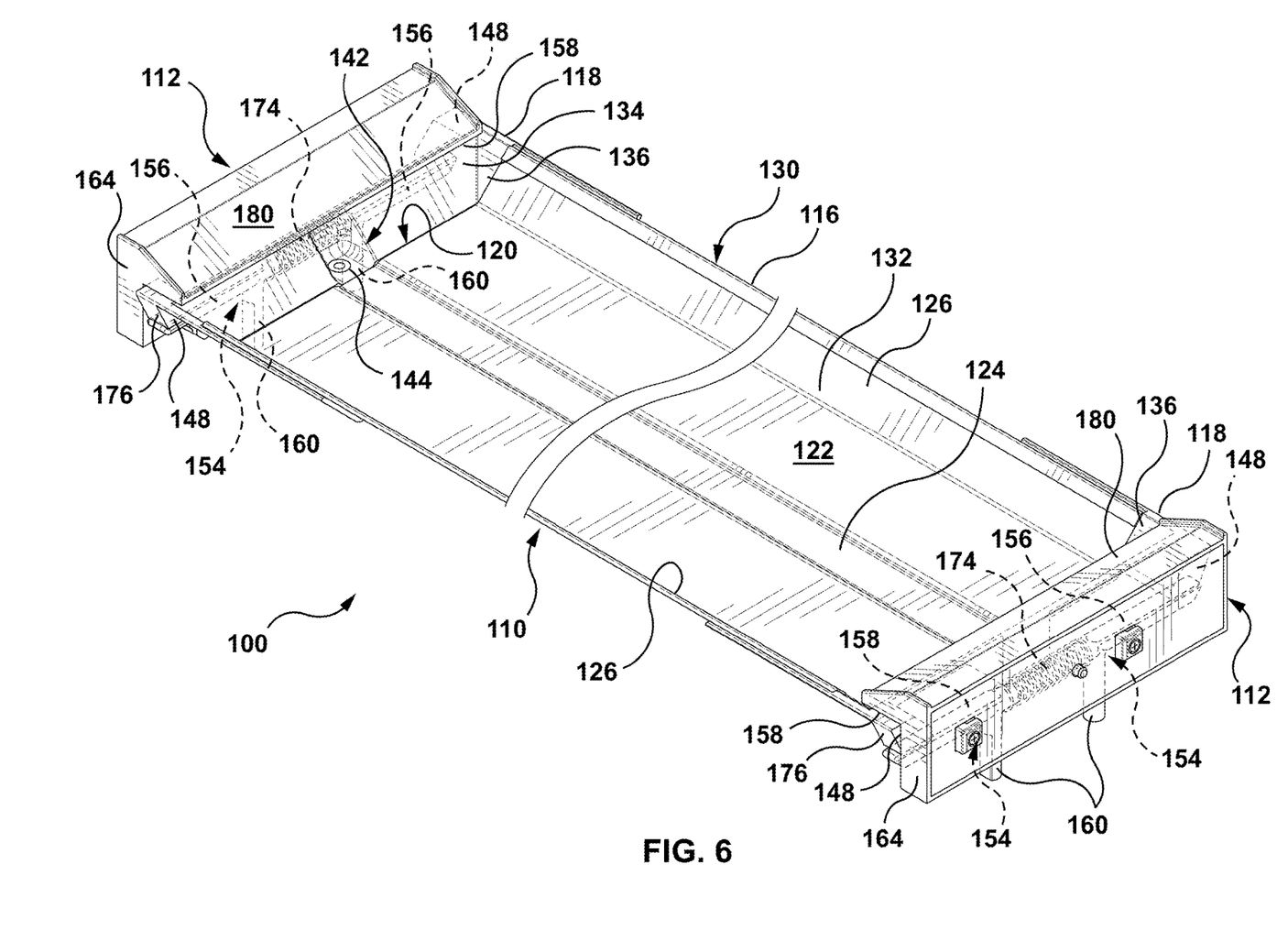
Figure 7:
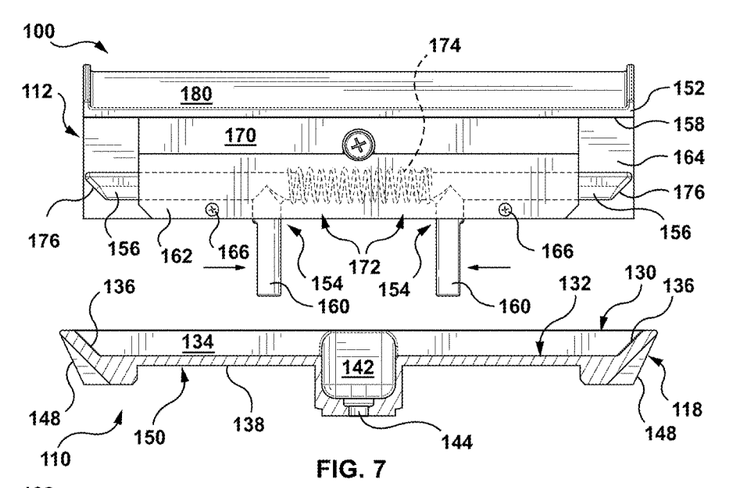
FIGS. 7 to 10 are end views, corresponding to FIGS. 3 to 6, respectively, showing to mounting of the illustrative shield element (shown in cross-section) to the illustrative mounting blocks.
Figure 8:
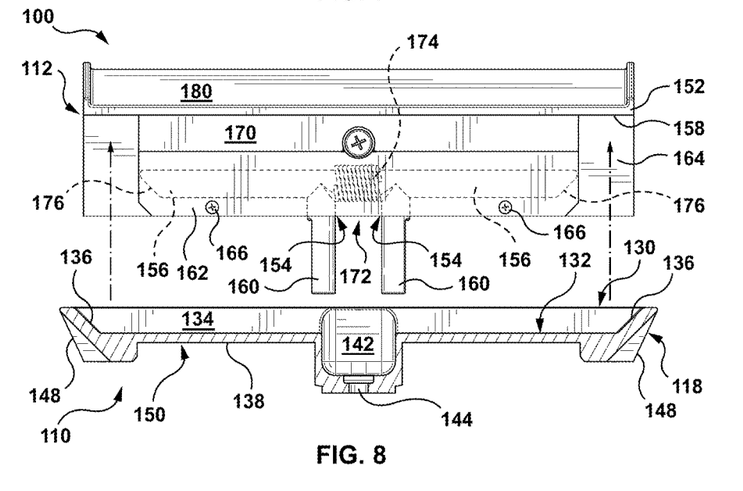
Figure 9:
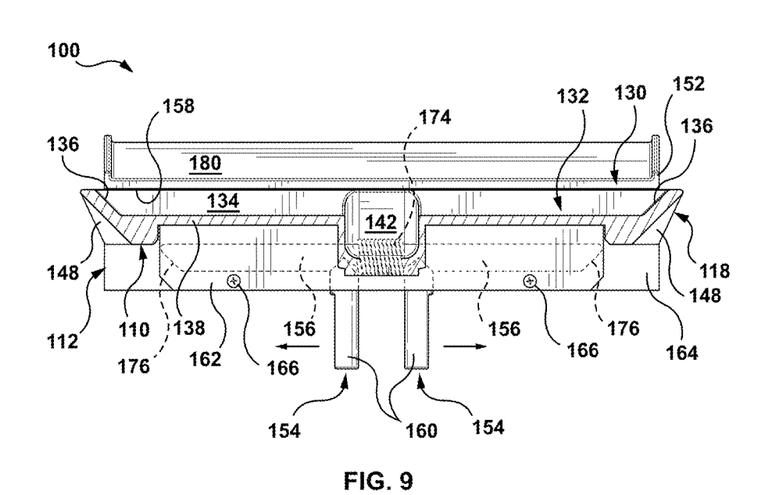
Figure 10:
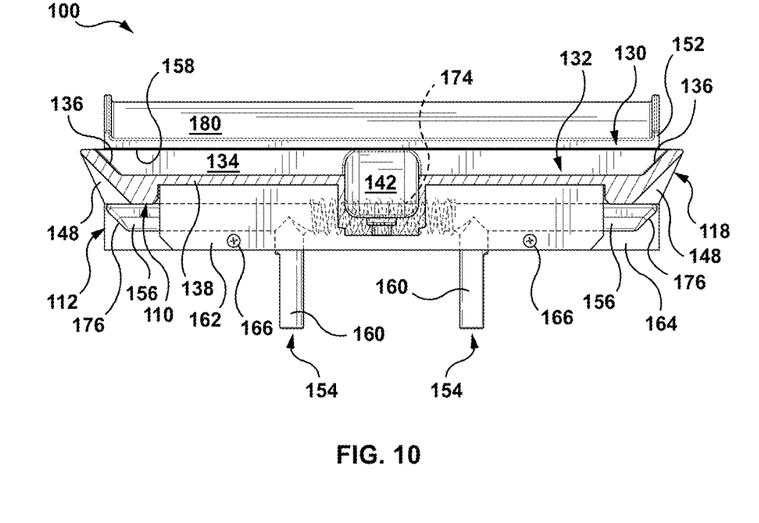

The latches 154 are movably carried by the mounting blocks 112 so as to be movable toward one another into a retracted configuration, as shown in FIGS. 4 and 8, and away from one another into an extended configuration, as shown in FIGS. 3 and 7. The locking ears 148 are sized, positioned and configured such that, when the latches 154 are in the extended configuration, the locking ears 148 fit between the latches 154 and the trap projection 152, but when the latches 154 are in the retracted configuration, the latches 154 are positioned vertically between the locking ears 148 (i.e. inwardly thereof). Thus, when the mounting blocks 112 are fixed to the sidewall 106 of the compartment 104 in opposed facing registration with one another, the latches 154 can trap and secure the tray 130 between the mounting blocks 112. More particularly, when the latches 154 are in the extended configuration and the locking ears are disposed between the latches 154 and the trap projection 152, as shown in FIGS. 6 and 10, the locking ears 148 are trapped between the latches 154 and the trap projections 152 to fix the shield element 110 within the compartment 104, with the shield element 110 extending substantially horizontally between the mounting blocks 112 with the drip catchment reservoir 132 facing upward, as shown in FIGS. 1 through 1B. In contrast, when the latches 154 are in the retracted configuration, the locking ears 148 are unrestrained by the latches 154, as shown in FIGS. 5 and 9, and the shield element 110 is free to fall away from the trap projections 152 for removal of the shield element 110 from the compartment 104.

In the illustrated embodiment, the latches 154 are substantially L-shaped and each comprise a latching arm 156 slidably carried by the mounting block 112 for movement generally parallel to the underside 158 of the trap projection 152, and an actuator arm 160 at approximately a right angle to the respective latching arm 156. In the illustrated embodiment, the latching arms 156 are slidably disposed within a hollow latch housing 162 mounted to a main body 164 of the mounting block 112 by lower screws or bolts 166. The latch housing 162 cooperates with a latch retaining member 170 depending from the trap protection 152 to retain the latching arms 156 within the latch housing 162. The latch housing 162 is configured to fit between the locking ears 148. A pair of slots 172 are formed in the latch housing 162, opposite the latch retaining member 170, and the actuator arms 160 extend through and can move reciprocally within the slots 172 as the latching arms 156 slide within the latch housing 162. The latching arms 156 are each configured to confine a respective one of the locking ears 148 between the respective latching arm 156 and the trap projection 152 when the latch 154 is in the extended configuration, and the actuator arms 160 are configured to be grasped between an operator's thumb and finger(s) for moving the latches 154 toward one another to move the latches 154 into the retracted configuration. In the illustrated embodiment, for each mounting block 112, a biasing member in the form of a compression to spring 174 is carried by the mounting block 112 and disposed within the latch housing 162, between the actuator arms 160, to bias the latches 154 away from one another toward the extended configuration. Thus, in a preferred embodiment the latches 154 are biased toward the extended configuration. Other suitable types of biasing members besides a compression spring may also be used.

As best seen in FIGS. 7 and 10, in the illustrated embodiment, each latching arm 156 has a sloped outer distal end 176 (distal relative to the respective actuator arm 160). The sloped outer distal end 176 forms a latching arm guide surface 176, and each locking ear 148 has a sloped inner end 178 forming a locking ear guide surface 178 (see also FIGS. 3 and 4). The latching arm guide surfaces 176 and the locking ear guide surfaces 178 are mated and configured such that sliding engagement of the latching arm guide surfaces 176 with the locking ear guide surfaces 178 urges the latches 154 toward one another from the extended configuration toward the retracted configuration.

Each trap projection 152 has a sloped roof 180. As best seen in FIG. 2, when the shield element 110 extends substantially horizontally between the mounting blocks 112 with the drip catchment reservoir 132 facing upward, the sloped roofs 180 of the trap projections 152 drain into the drip catchment reservoir.

Mounting of the shield element 110 to, and dismounting of the shield element 110 from, the mounting blocks 112 will now be described.

Reference is first made to FIGS. 3 and 7, which show an initial position in which the shield element 110 is dismounted from the mounting blocks 112 and the latches 154 are in the extended configuration. To mount the shield element 110 to the mounting blocks 112, the following procedure may be used. An operator would move the actuator arms 160 toward one another, which compresses the compression spring 174 and moves the latches 154 into the retracted configuration, as shown in FIGS. 4 and 8. The shield element 110 can now be moved upward into engagement with the mounting block 112, as shown in FIGS. 5 and 9, as the locking ears 148 are free to move past the retracted locking arms 156 of the latches 154 until the locking ears 148 contact the underside 158 of the trap projection 152, with the latch housing 162 disposed in the receiving space 150 between the locking ears 148. The operator can then release the actuator arms 160, after which the compression spring 174 will return the latches 154 to the extended configuration. The locking ears 148 are now trapped between the latching arms 156 and the underside 158 of the trap projection 152 so that the shield element 110 is retained by the mounting block 112, as shown in FIGS. 6 and 10, and the shield element 110 is now mounted to the mounting blocks 112.

Note that with the illustrated embodiment, it is also possible to mount the shield element 110 by simply pushing the shield element 110 upward into the mounting block 112 from below. More particularly, during such upward movement, the locking ear guide surfaces 178 will engage the latching arm guide surfaces 176, and as the locking ears 148 move upward, the latching arm guide surfaces 176 will slide along the locking ear guide surfaces 178, forcing the latching arms 156 inwardly toward one another against the compression spring 174. Once the locking ears 148 have moved past the latching arms 156, the compression spring 174 will return the latches 154 to the extended configuration. This will trap the locking ears 148 between the latching arms 156 and the underside 158 of the trap projection 152, with the shield element 110 thereby retained by the mounting block 112.

To dismount the shield element 110 from the mounting blocks 112, an operator would then move the actuator arms 160 toward one another, which compresses the compression spring 174 and moves the latches 154 into the retracted configuration (FIGS. 5 and 9). When the latches 154 are in the retracted configuration, the locking ears 148 are unrestrained by the latching arms 156, as shown in FIGS. 5 and 9, and the shield element 110 can be lowered away from the mounting block for removal of the shield element 110 from the compartment 104.

The latching mechanism described above is merely one illustrative embodiment of a latching mechanism, and is not intended to be limiting. Other types of latching mechanisms may equivalently be used, including, by way of non-limiting example, barrel bolts, spring-loaded barrel bolts, Fox-style police double bar locks, deadbolts, sliding latches with setscrews, among others. Depending on the mechanism, the use of a biasing member may be omitted.

Certain illustrative embodiments have been described by way of example. It will be apparent to persons skilled in the art that a number of variations and modifications can be made without departing from the scope of the claims.

LIST OF REFERENCE NUMERALS

The following list of reference numerals is provided for convenience, and is not intended to be limiting.
100 Shield system (overall)
102 Roller-shutter door
104 Vehicle compartment
106 Sidewalls of vehicle compartment
110 Shield element
112 Mounting blocks
114 Mounting plates
116 Tray base
118 End cap
120 Longitudinal end of tray base
122 Basal surface of tray base
124 Longitudinally extending channel formed in basal surface
126 Sides of tray base
128 Tray end
130 Tray
132 Drip catchment reservoir
134 End wall of end cap
136 Side walls of end cap
138 Tray base support of end cap
140 Adhesive-receiving channels
142 Recess in end wall
144 Drainage aperture
146 Drainage tube
148 Locking ears
150 Receiving space
152 Trap projection
154 Latches
156 Latching arm
158 Underside of trap projection
160 Actuator arm
162 Latch housing
164 Main body of mounting block
166 Lower screws/bolts
170 Latch retaining member
172 Slots in latch housing
174 Compression spring
176 Sloped outer distal end of latching arm/latching arm guide surface
178 Sloped inner end of locking ear/locking ear guide surface
180 Sloped roof of trap projection

What is claimed is:

1. A bidirectional shield system for a roll-up shutter door of an externally accessible vehicle compartment; the shield system comprising:
a longitudinally extending shield element; and
two mounting blocks;
wherein:
the shield element comprises a longitudinally extending tray having an open-topped drip catchment reservoir formed in the tray;
laterally inwardly projecting locking ears are disposed at longitudinal ends of the shield element;
each mounting block is configured to be fixed to a sidewall of the compartment in opposed facing registration with one another;
each mounting block has at least one overhanging upper trap projection;
each mounting block carries a pair of latches disposed inferiorly of and spaced from the trap projection;
the latches being movable between a retracted configuration and an extended configuration;
the locking ears being sized, positioned and configured to fit between the latches in the extended configuration and the trap projection;
whereby, when the mounting blocks are fixed to the respective sidewalls of the compartment in opposed facing registration with one another:
when the latches are in the extended configuration and the locking ears are disposed between the latches and the trap projection, the locking ears are trapped between the latches and the trap projections to fix the shield element within the compartment
wherein the shield element extends substantially horizontally between the mounting blocks with the drip catchment reservoir facing upward, and
when the latches are in the retracted configuration, the shield element is free to fall away from the trap projections for removal of the shield element from the compartment.

2. The shield system of claim 1, wherein the latches are biased toward the extended configuration.

3. The shield system of claim 1, wherein the latches are movable toward one another into the retracted configuration and away from one another into the extended configuration.

4. The shield system of claim 3, wherein:
the latches are substantially L-shaped and each comprise:
a latching arm slidably carried by the mounting block and configured to confine a respective one of the locking ears between the latching arm and the trap projection; and;
an actuator arm;
wherein, for each mounting block, a biasing member is carried by the mounting block and disposed between the latches to bias the latches away from one another toward the extended configuration.

5. The shield system of claim 4, wherein the biasing member is a compression spring.

6. The shield system of claim 4, wherein:
the locking ears extend longitudinally beyond a tray end of the shield element whereby a receiving space is formed between the locking ears; and
the latching arms are slidably disposed within a latch housing, wherein the latch housing is configured to fit in the receiving space between the locking ears.

7. The shield system of claim 5, wherein:
each latching arm has a sloped outer distal end relative to the respective actuator arm, the sloped outer distal end forming a latching arm guide surface;
each locking ear has a sloped inner end forming a locking ear guide surface; and
the latching arm guide surfaces and the locking ear guide surfaces are mated and configured such that sliding engagement of the latching arm guide surfaces with the locking ear guide surfaces during movement of the shield element toward the mounting block urges the latches toward one another from the extended configuration toward the retracted configuration until the locking ears have moved past the latching arms, whereupon the biasing member will return the latches to the extended configuration to trap each of the locking ears between a respective one of the latching arms and the trap projection.

8. The shield system of claim 1, wherein:
each trap projection has a sloped roof; and
when the shield element extends substantially horizontally between the mounting blocks with the drip catchment reservoir facing upward, the sloped roofs of the trap projection drain into the drip catchment reservoir.

9. The shield system of claim 1, wherein each mounting block is configured to be fixed directly to the respective sidewall of the compartment.

10. The shield system of claim 1, wherein each mounting block is configured to be fixed indirectly to the respective sidewall of the compartment by at least one supporting component interposed between the mounting block and the respective sidewall of the compartment.

11. The shield system of claim 8, wherein the at least one supporting component comprises at least one mounting plate.

12. A bidirectional shield system for a roll-up shutter door of an externally accessible vehicle compartment; the shield system comprising:
a longitudinally extending shield element; and
two mounting blocks;
wherein:
the shield element comprises a longitudinally extending tray having an open-topped drip catchment reservoir formed in the tray;
laterally inwardly projecting locking ears are disposed at longitudinal ends of the shield element;
wherein the locking ears extend longitudinally beyond a tray end of the shield element whereby a receiving space is formed between the locking ears;
each mounting block is configured to be fixed to a sidewall of the compartment in opposed facing registration with one another;
each mounting block has at least one overhanging upper trap projection;
each mounting block carries a pair of latches disposed inferiorly of and spaced from the trap projection;
the latches are movable toward one another into a retracted configuration and away from one another into an extended configuration;
the latches are substantially L-shaped and each comprise:
a latching arm slidably carried by the mounting block and configured to confine a respective one of the locking ears between the latching arm and the trap projection; and;
an actuator arm;
wherein, for each mounting block, a biasing member is carried by the mounting block and disposed between the latches to bias the latches away from one another toward the extended configuration;
wherein the latching arms are slidably disposed within a latch housing, wherein the latch housing is configured to fit in the receiving space between the locking ears;
the locking ears being sized, positioned and configured so that, when the latch housing is disposed within the receiving space between the locking ears with the latches in the extended configuration, each of the locking ears is trapped between a respective one of the latching arms and the trap projection;
whereby, when the mounting blocks are fixed to the respective sidewalls of the compartment in opposed facing registration with one another:
when the latches are in the extended configuration and the locking ears are disposed between the latches and the trap projection, the locking ears are trapped between the latches and the trap projections to fix the shield element within the compartment wherein the shield element extends substantially horizontally between the mounting blocks with the drip catchment reservoir facing upward, and
when the latches are in the retracted configuration, the shield element is free to fall away from the trap projections for removal of the shield element from the compartment.

13. The shield system of claim 12, wherein:
each latching arm has a sloped outer distal end relative to the respective actuator arm, the sloped outer distal end forming a latching arm guide surface;
each locking ear has a sloped inner end forming a locking ear guide surface; and
the latching arm guide surfaces and the locking ear guide surfaces are mated and configured such that sliding engagement of the latching arm guide surfaces with the locking ear guide surfaces during movement of the shield element toward the mounting block urges the latches toward one another from the extended configuration toward the retracted configuration until the locking ears have moved past the latching arms, whereupon the biasing member will return the latches to the extended configuration to trap each of the locking ears between a respective one of the latching arms and the trap projection.

14. The shield system of claim 12, wherein the biasing member is a compression spring.

15. The shield system of claim 12, wherein:
each trap projection has a sloped roof; and
when the shield element extends substantially horizontally between the mounting blocks with the drip catchment reservoir facing upward, the sloped roofs of the trap projection drain into the drip catchment reservoir.

* * * * *